United States Patent [19]

Funaki et al.

[11] Patent Number: 5,494,984
[45] Date of Patent: Feb. 27, 1996

[54] METHOD FOR PRODUCING A FLUORINATED POLYMER

[75] Inventors: Atsushi Funaki; Teruo Takakura; Kazuo Kato, all of Yokohama; Kazuo Hamazaki, Ichihara; Haruhisa Miyake, Yokohama, all of Japan

[73] Assignee: Asahi Glass Company Ltd., Tokyo, Japan

[21] Appl. No.: 325,437

[22] PCT Filed: Mar. 16, 1994

[86] PCT No.: PCT/JP94/00420

§ 371 Date: Nov. 9, 1994

§ 102(e) Date: Nov. 9, 1994

[87] PCT Pub. No.: WO94/21696

PCT Pub. Date: Sep. 29, 1994

[30] Foreign Application Priority Data

Mar. 17, 1993 [JP] Japan ..................... 5-82704
Apr. 16, 1993 [JP] Japan ..................... 5-114137
Jul. 23, 1993 [JP] Japan ..................... 5-202928

[51] Int. Cl.[6] ........................................ C08F 2/38
[52] U.S. Cl. ............................ 526/206; 526/255
[58] Field of Search ............................... 526/206

[56] References Cited

U.S. PATENT DOCUMENTS 5,037,914 8/1991 Monti ..................... 526/206
5,182,342 1/1993 Feiring et al. .

FOREIGN PATENT DOCUMENTS 0211251 2/1987 European Pat. Off. ............ 526/206
805115 11/1958 United Kingdom ............... 526/206
1027411 4/1966 United Kingdom ............... 526/206
1057088 2/1967 United Kingdom ............... 526/206

OTHER PUBLICATIONS

Tirkashev et al 1983. CA 99:71240 pp. 51, 52.
Zhang et al 1985. CA 105:7001 pp. 44, 45.
Tabata 1970 CA 78:85081 pp. 60, 61.

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

A method for producing a fluorinated polymer containing fluoroolefin units as the main constituting units, wherein $CF_3(CF_2)_nCH_2CH_3$ or $CF_3(CF_2)_nH$, wherein n is an integer of from 1 to 8), the is used as the polymerization medium, and $CF_2ClCF_2CHClF$ and/or $CF_3CF_2CHCl_2$ as a chain transfer agent.

Using the polymerization medium which is less likely to bring about an environmental destruction, it is possible to obtain a fluorinated polymer excellent in the heat resistance, solvent resistance, chemical resistance, etc. Further, the above chain transfer agent has good compatibility with the polymerization medium which scarcely brings about the environmental destruction, whereby it is possible to efficiently produce a fluorinated polymer excellent in the heat resistance and solvent resistance. This chain transfer agent has affinity to the resulting polymer and to the polymerization medium and has excellent handling efficiency for post treatment such as granulation or drying.

10 Claims, No Drawings

METHOD FOR PRODUCING A FLUORINATED POLYMER

TECHNICAL FIELD

The present invention relates to a noble method for producing a fluorinated polymer, particular to a method for efficiently producing a fluorine-type polymer excellent in the heat resistance, solvent resistance, chemical resistance, etc. by means of a polymerization medium which is less likely to bring about an environmental destruction.

BACKGROUND ART

In recent years, fluorinated polymers have been used for various applications utilizing their characteristics, since they are polymer materials excellent in the heat resistance, solvent resistance, chemical resistance, etc.

As a method for producing fluorinated polymers, a solution polymerization method, a suspension polymerization method or an elusion polymerization method is known. As a polymerization medium for the solution polymerization method or the suspension polymerization method, an inert solvent such as a chlorofluorocarbon is usually employed from the viewpoint of the polymerization speed or for a reason that it presents a copolymer of high molecular weight. Specific examples of such a chlorofluorocarbon include trichlorofluoromethane, dichlorodifluoromethane, trichlorotrifluoromethane and dichlorotetrafluoroethane. From the viewpoint of the handling efficiency, trichlorotrifluoroethane is mainly used.

Whereas, in recent years, destruction of the ozone layer has been taken up internationally as a problem of environmental destruction of global scale, and as a responsible substance, the chlorofluorocarbon has been pointed out, and there is worldwide trend for total abolition of its use. Therefore, it is now necessary to stop using the chlorofluorocarbon which has been used at the time of producing fluorinated polymer.

As a substitute for such a chlorofluorocarbon, a hydrofluorocarbon having fluorine atoms, has been proposed, as it has a small ozone-destructing coefficient. However, a substance having a C—H bond has been known to show a chain transfer property to a fluoroolefin, and it has been believed that it is difficult to use a hydrochlorofluorocarbon containing hydrogen atoms, as a polymerization medium for the production of a fluoroolefin-type polymer of a high molecular weight. As other substitutes for the polymerization medium, t-butanol (Japanese Examined Patent Publication No. 24073/1977), etc. are known, but it is thereby necessary to conduct polymerization under a high pressure in order to obtain a polymer having a sufficiently high molecular weight.

Further, when these substitutes are used as polymerization media, a commonly employed chain transfer agent, such as methanol, may sometimes be hardly compatible with such polymerization media and, in such a case, is not useful as a chain transfer agent. Further, a perfluorocarbon or hydrofluorocarbon has poor affinity with the polymer, whereby handling efficiency tends to be poor in a step after polymerization (such as granulation or drying).

Under these circumstances, the present invention has been accomplished for the purposes of providing a chain transfer agent whereby a fluorinated polymer excellent in the heat resistance, solvent resistance and chemical resistance can efficiently be produced when a perfluorocarbon or hydrofluorocarbon is used as a polymerization medium, and providing a method for efficiently producing a fluorinated polymer excellent in the heat resistance, solvent resistance and chemical resistance, whereby the polymerization rate is high and the molecular weight of the fluorinated polymer can sufficiently be increased, without using a chlorofluorocarbon having a large ozone destruction coefficient.

DISCLOSURE OF INVENTION

A result of extensive researches to accomplish the above objects, the present inventors have found it possible to accomplish the objects by using $CF_2CF_2CHClF$ and/or $CF_3CF_2CHCl_2$ as a chain transfer agent for polymerization and by using as a polymerization medium a (perhaloalkyl)difluoromethane which was found to have a little chain transfer property.

That is, the present invention provides a method for producing a fluorinated polymer containing fluoroolefin units as the main constituting units by polymerization in polymerization medium, wherein a (perhaloalkyl)difluoromethane is used as the polymerization medium, and a method for producing a fluorinated polymer, whereby together with the above polymerization medium, $CF_2ClCF_2CHClF$ and/or $CF_3CF_2CHCl_2$ is used as a chain transfer agent.

In the present invention, the fluorinated polymer containing fluoroolefin units as the main constituting units, can be produced by polymerizing a fluoroolefin monomer alone or copolymerizing a fluoroolefin monomer with the following polymerizable monomer other than the fluoroolefin monomer. As the copolymer, a tetrafluoroethylene (TFE)/ethylene copolymer, a TFE/perfluoro(alkyl vinyl ether) copolymer or a TFE/hexafluoropropylene (HFP) copolymer may, for example, be mentioned.

The fluoroolefin monomer to be used in the present invention is an olefin having at least one fluorine atom in its molecule, preferably a fluoroolefin monomer having 2 or 3 carbon atoms in view of the polymerizability and the properties of the resulting polymer.

Specific examples of such a fluoroolefin monomer include a fluoroethylene type such as TFE, $CF_2$=$CFCl$ or $CF_2$=$CH_2$, and a fluoropropylene type such as HFP or $CF_2$=$CHCF_3$. These fluoroolefin monomers may be used alone or in combination of two or more of them.

Further, these fluoroolefin monomers may be used in combination with a copolymerizable monomer of e.g. a (perfluoroalkyl)ethylene type with the carbon number of the perfluoroalkyl group being from 4 to 12, such as $CF_3CF_2CF_2CF_2CH$=$CH_2$ or $CF_3CF_2CF_2CF_2CF$=$CH_2$, a perfluorovinyl ether type such as $R_f(OCFXCF_2)_mOCF$=$CF_2$ (wherein $R_f$ is a perfluoroalkyl group having from 1 to 6 carbon atoms, X is a fluorine atom or a trifluoromethyl group, and m is an integer of from 1 to 6), or a vinyl ether having a group which can readily be converted to a carboxylic acid group or a sulfonic acid group, such as $CH_3OC(=O)CF_2CF_2CF_2OCF$=$CF_2$ or $FSO_2CF_2CF_2OCF(CF_3)CF_2OCF$= $CF_2$. Otherwise, they may be combined with an olefin-type monomer such as ethylene, propylene or isobutylene.

In the present invention, a hydrofluorocarbon of the formula $CF_3(CF_2)_nCH_2CH_3$ or $CF_3(CF_2)_nH$, wherein n is an integer of from 1 to 8, is used as the polymerization medium. As other hydrofluorocarbons, $H(CF_2)_nH$ wherein n is an integer of from 1 to 8, $CF_3CF_2CHFCHFCF_3$, $CHF_2CF_2CF_2CHF_2$, an alkane obtained by addition of hydrogen or hydrogen fluoride to an oligomer of TFE and/or HFP, and mixtures thereof, may also be used. Further, perfluorocarbons such as perfluoropentane, perfluorohexane, perfluroheptane, perflurooctane, perfluorocyclohexane and mixtures thereof, may also be used.

In the present invention, if the chain length of the perfluoroalkyl group $CF_3(CF_2)_n$— of the above mentioned $CF_3(CF_2)_nCH_2CH_3$ or $CF_3(CF_2)_nH$, wherein n is an integer of from 1 to 8, is too short, the boiling point will be too low, and the compound will be a gas at room temperature, which is inconvenient for handling. On the other hand, if the chain length is too long, the boiling point will be too high, and separation of the polymer from the solvent will be difficult. The perfluoroalkyl group is linear or branched, preferably linear, and with respect to its carbon number, n is an integer of from 1 to 8, preferably from 2 to 7, more preferably from 3 to 6. Particularly preferred as $CF_3(CF_2)_nCH_2CH_3$, is $CF_3(CF_2)_3CH_2CH_3$. Particularly preferred as $CF_3(CF_2)_nH$, is $CF_3(CF_2)_5H$.

As another preferred polymerization medium, a saturated organic compound may be mentioned which consists solely of fluorine atoms, at least one and at most the same number as the number of fluorine atoms, of hydrogen atoms, and from 3 to 10 carbon atoms, wherein primary carbon bonded to hydrogen atoms is not more than one, and the degree of swelling is at least 1.0, preferably at least 1.5. If the number of carbon atoms is 2 or less, the boiling point tends to be too low, and the polymerization pressure tends to increase. On the other hand, if it exceeds 11, the boiling point tends to be too high, and it becomes difficult to separate the copolymer and the polymerization medium after the polymerization, such being disadvantageous from the viewpoint of production. If hydrogen atoms exist in a number larger than the number of fluorine atoms, such hydrogen atoms tend to undergo chain transfer, such being undesirable. Further, a saturated organic compound having a degree of swelling of less than 1.0, is not desirable, since the copolymer obtained by using it as a polymerization medium will have a wide molecular weight distribution, and will be poor in the tensile strength and elongation at a temperature of about 200° C. Among such compounds, particularly preferred polymerization media include 1,1,2,2-tetrafluorocyclobutane, $CF_3CFHCF_2CF_2CF_3$, $CF_3CF_2CF_2CF_2CF_2H$, $CF_3CF_2CFHCF_2CF_3$, $CF_3CFHCFHCF_2CF_3$, $CF_2HCFHCF_2CF_2CF_3$, $CF_3CF_2CF_2CF_2CF_2H$, $CF_3CH(CF_3)CF_2CF_2CF_3$, $CF_3CF(CF_3)CFHCF_2CF_3$, $CF_3CF(CF_3)CFHCFHCF_3$, $CF_3CH(CF_3)CFHCF_2CF_3$ and $CF_3CF_2CF_2CF_2CH_2CH_3$.

The degree of swelling was measured as follows. A strip-shaped film of tetrafluoroethylene (TFE)/ethylene copolymer having a thickness of 21 μm, a width of 1 cm and a length of 24 cm, was put into a stainless steel pressure ample and the polymerization medium was introduced to completely immerse the film, whereupon the ample was sealed and maintained at 150° C. for 24 hours. Then, it was cooled to room temperature and the tetrafluoroethylene (TFE)/ethylene copolymer film was taken out, and the increase (%) of its length was measured. The increase was taken as the degree of swelling of the polymerization medium.

In a case where the chain transfer agent is an alcohol, a preferred polymerization medium is a saturated organic compound which consists solely of from 3 to 10 carbon atoms, fluorine atoms and at least one and at most the same number as the number of fluorine atoms, of hydrogen atoms. If the number of carbon atoms is two or less, the boiling point tends to be too low, and the polymerization pressure tends to be too high. On the other hand, if it is 11 or more, the boiling point tends to be too high, and it will be difficult to separate the polymer and the polymerization medium after the polymerization, such being practically disadvantageous. If no hydrogen is present, an alcohol such as methanol can not be used as a chain transfer agent. On the other hand, if hydrogen atoms are present in a number larger than the number of fluorine atoms, such hydrogen atoms will undergo chain transfer, such begin undesirable.

A particularly preferred polymerization medium among such compounds is $C_4F_4H_4$, $C_4F_8H_2$, $C_5F_{11}H$, $C_5F_{10}H_2$, $C_6F_{13}H$, $C_6F_{12}H_2$ or $C_6F_9H_5$. Specifically, 1,1,2,2-tetrafluorocyclobutane, $CF_2HCF_2CF_2CF_2H$, $CF_3CFHCF_2CF_2CF_3$, $CF_3CF_2CF_2CF_2CF_2H$, $CF_3CF_2CFHCF_2CF_3$, $CF_3CFHCFHCF_2CF_3$, $CF_2HCF_2CF_2CF_2CF_2H$, $CF_2HCFHCF_2CF_2CF_3$, $CF_3CF_2CF_2CF_2CF_2H$, $CF_3CH(CF_3)CF_2CF_2CF_3$, $CF_3CF(CF_3)CFHCF_2CF_3$, $CF_3CF(CF_3)CFHCFHCF_3$, $CF_3CH(CF_3)CFHCF_2CF_3$, $CF_2HCF_2CF_2CF_2CF_2H$ or $CF_3CF_2CF_2CF_2CH_2CH_3$ may, for example, be mentioned.

In the polymerization in the present invention, it is usual to add a chain transfer agent for the purpose of controlling the molecular weight of the polymer. This compound is required to be soluble in the polymerization medium. However, a compound having large chain transfer constant, may be only slightly soluble in the polymerization medium in view of easiness in the control of the molecular weight. Further, it preferably has a small ozone destruction coefficient.

The compound satisfying these requirements may, for example, be a hydrocarbon such as hexane, a hydrofluorocarbon such as $CF_2H_2$, a hydrochlorofluorocarbon such as $CF_3CF_2CHCl_2$ or $CF_2ClCF_2CHClF$, a ketone such as acetone, an alcohol such as methanol or ethanol, or a mercaptan such as methyl mercaptan. The amount varies depending upon the size of the chain transfer constant of the compound, but may usually be from about 0.01 wt % to 50 wt %, based on the polymerization medium.

A preferred chain transfer agent is an alcohol such as methanol or ethanol, or a hydrochlorofluorocarbon such as $CF_2ClCF_2CHClF$ and/or $CF_3CF_2CHCl_2$. Particularly preferred is methanol or $CF_2ClCF_2CHClF$.

In the present invention, chain transfer agents $CF_2ClCF_2CHClF$ and $CF_3CF_2CHCl_2$ may be used alone or in combination as a mixture. When they are mixed, the mixing proportions of $CF_2ClCF_2CHClF$ and $CF_3CF_2CHCl_2$ can be selected within wide ranges. The former may be 0.01 to 99.99 wt %, and the latter may be from 99.99 to 0.01 wt %. Preferably, the former is from 0.1 to 99.9 wt %, and the latter is from 99.9 to 0.1 wt %. From the viewpoint of thermal stability, it is preferred to use $CF_2ClCF_2CHClF$ alone or in combination as a mixture containing from 50 to 60 wt % thereof.

Further, as a chain transfer agent for a perfluoro polymer such as a TFE/perfluoro(alkyl vinyl ether) copolymer or a TFE/HFP copolymer, it is preferred to use $CF_3CF_2CHCl_2$ alone or in combination as a mixture containing from 50 to 60 wt % thereof.

In the present invention, the above polymerization medium may be used in combination with an inert solvent such as water incorporated thereto. The amount of the polymerization medium may vary depending upon the type of the monomer to be polymerized, but is usually from 3 to 100 times, preferably from 5 to 50 times, the total weight of the monomers. Further, the amount of the chain transfer agent may vary depending upon the molecular weight of the polymer to be obtained, but is usually from 0.01 to 200 wt %, preferably from 0.05 to 100 wt %, based on the total weight of the polymerization medium.

In the present invention, either type of a solution polymerization method and a suspension polymerization method may be employed as the polymerization type, and the polymerization initiator may suitably be selected among those commonly used depending upon the type of polymerization. For example, an organic peroxide such as di(chlorofluoroacyl) peroxide, di(perfluoroacyl)peroxide, di(ω-hydroperfluoroacyl)peroxide, t-butyl peroxyisobutyrate or diisopropyl peroxydicarbonate, or an azo compound such as azobis(isobutyronitrile), may be mentioned. The amount of the polymerization initiator may suitable be changed depending upon the type and the polymerization reaction conditions. However, it is usually from 0.005 to 5 wt %, preferably from 0.05 to 0.5 wt %, based on the total amount of the monomers to be polymerized. Even a polymerization initiator which does not dissolve in a perfluorocarbon or a hydrofluorocarbon, may dissolve in solvent mixture of a perfluorocarbon or a hydrofluorocarbon with $CF_2ClCF_2CHFCl$ and/or $CF_3CF_2CHCl_2$, and may accordingly be used.

For the polymerization reaction of the present invention, a wide range of reaction conditions may be employed without any particular restriction. For example, for the polymerization reaction temperature, the optimum value may be selected depending upon e.g. the type of the polymerization initiating source, but usually, a temperature of from 0° to 100° C., preferably from 30° to 90° C., may be employed. The reaction pressure may also be optionally selected, but is usually from 2 to 100 kg/cm², preferably from 5 to 20 kg/cm². In the present invention, the polymerization can advantageously be conducted without requiring an excess reaction pressure. However, it is possible to employ a high pressure, and by the same token, a reduced pressure condition may be employed. Further, the present invention can be conducted by an optional system such as a batch system or a continuous system.

BEST MODE FOR CARRYING OUT THE INVENTION

In the Examples, the volume flow rate is the one obtained by measuring the volume (mm³) per unit time (second) of the polymer discharged from a nozzle having an inner diameter of 1 mm and a land length of 2 mm at a temperature of 300° C. under a load of 30 kg by a flow tester of Takashita type.

EXAMPLE 1

A stainless steel reactor having an internal capacity of 1.2 l was deaerated, and 1300 kg of (perfluoropentyl)difluoromethane, 1.8 g of (perfluorobutyl)ethylene, 85 g of tetrafluoroethylene and 5.9 g of ethylene were charged. The temperature was maintained at 50° C., and a perfluorohexane solution containing 1 wt % of di(perfluorobutyl)peroxide as a polymerization initiator, was charged to initiate the reaction. During the reaction, a gas mixture of tetrafluoroethylene and ethylene (molar ratio: $C_2F_4/C_2H_4$=53/47) was introduced into the system, and the reaction pressure was maintained at 8.7 kg/cm². The polymerization initiator was intermittently charged so that the polymerization rate became substantially constant, and a total amount of 18 cc was charged. Three hours later, 64 g of a white copolymer was obtained in the form of a slurry. The copolymer had a melting point of 275° C. and a heat decomposition initiating point of 365° C., and gave an excellent compression molded product at a molding temperature of 300° C. With respect to the molded product, the tensile strength was 475 kg/cm², and the tensile elongation was 430%.

EXAMPLE 2

A stainless steel reactor having an internal capacity of 1.2 l was deaerated, and 1400 g of (perfluoropentyl)difluoromethane, 32 g of perfluoro(propyl vinyl ether) and 80 g of tetrafluoroethylene were charged. The temperature was maintained at 50° C., and a perfluorohexane solution containing 1 wt % of di(perfluorobutyl)peroxide as a polymerization initiator, was charged to initiate the reaction. During the reaction, tetrafluoroethylene was introduced into the system, and the reaction pressure was maintained at 5.4 kg/cm². The polymerization initiator was intermittently charged so that the polymerization rate became substantially constant, and a total amount of 7 cc was charged. 2.4 hours later, 69 g of a white copolymer was obtained in the form of a slurry. The copolymer had a melting point of 306° C. and a heat decomposition initiating point of 440° C. and gave an excellent compression molded product at a molding temperature of 340° C. With respect to the molded product, the tensile strength was 430 kg/cm², and the tensile elongation was 360%.

EXAMPLE 3

Polymerization was carried out in the same manner as in Example 2 except that 400 g of hexafluoropropylene was charged instead of 32 g of perfluoropropylvinyl ether, and the amount of (perfluoropentyl)difluoromethane charged, was changed from 1400 g to 1000 g, and 3.5 hours later, 60 g of a white copolymer was obtained in the form of a slurry. The copolymer had a melting point of 282° C. and a heat decomposition initiating point of 435° C., and gave an excellent compression molded product at a molding temperature of 340° C. With respect to the molded product, the tensile strength was 350 kg/cm², and the tensile elongation was 350%.

EXAMPLE 4

Polymerization was carried out in the same manner as in Example 1 except that (perfluoroheptyl)difluoro methane was charged instead of (perfluoropentyl)difluoromethane, and 3.5 hours later, 74 g of a white copolymer was obtained in the form of a slurry. The copolymer had a melting point of 276° C. and a heat decomposition initiating point of 380° C., and gave an excellent compression molded product at a molding temperature of 300° C. With respect to the molded product, the tensile strength was 420 kg/cm² and the tensile elongation was 450%.

COMPARATIVE EXAMPLE 1

Into a stainless steel reactor having an internal capacity of 1.2 l, 500 g of deoxidized water, 200 g of t-butanol and 0.65 g of disuccinic peroxide were charged. The temperature was maintained at 65° C., and the reaction was carried out. During the reaction, a gas mixture of tetrafluoroethylene and ethylene (molar ratio: $C_2F_4/C_2H_4$= 53/47) was introduced into the system, and the reaction pressure was maintained at 9 kg/cm². Four hours later, 24.6 g of a white copolymer was obtained. The copolymer had a melting point of 269° C. and a heat decomposition initiating temperature of 361° C. The molded product obtained by compression molding at 300° C. had a low molecular weight and was brittle.

REFERENCE EXAMPLE 1

Polymerization was carried out in the same manner as in Example 1 except that 1255 g of 1,1,2-trichlorotrifluoroethane (R113) was charged instead of charging (perfluoropentyl)difluoromethane, and 13.5 g of 1,1-dichloro-2,2,3,3,3-pentafluoropropane charged as a chain transfer agent, and 2.5 hours later, 48 g of a white copolymer was obtained in the form of a slurry. The copolymer had a melting point of 274° C. and a heat decomposition initiating point of 352° C., and gave an excellent compression molding product at a molding temperature of 300° C. With respect to the molded product, the tensile strength was 431 kg/cm$^2$, and the tensile elongation was 450%.

EXAMPLE 5

A stainless steel reactor having an internal capacity of 1.2 l was deaerated, and 1000 g of (perfluoropentyl)difluoromethane, 410 g of $CF_2F_2ClCF_2CHClF$, 1.8 g of (perfluorobutyl)ethylene, 85 g of TFE and 5.9 g of ethylene were charged. The temperature was maintained at 50° C., and a perfluorohexane solution containing 1 wt % of di(perfluorobutyryl)peroxide as a polymerization initiator, was charged to initiate the reaction. During the reaction, a gas mixture of TFE and ethylene (molar ratio: TFE/ethylene= 53/47) was introduced into the system, and the reaction pressure was maintained at 8.1 kg/cm$^2$. The polymerization initiator was intermittently charged so that the polymerization rate became substantially constant, and a total amount of 23 cc was charged. Three hours later, 72 g of a white copolymer was obtained in the form of a slurry. Further, it was granulated to have an average particle size of about 1 mm by using water as a medium. The copolymer had a melting point of 272° C. and a heat decomposition initiating point of 358° C., and gave a colorless excellent compression molded product at a molding temperature of 300° C. With respect to the molded product, the tensile strength was 470 kg/cm$^2$, and the tensile elongation was 420%.

EXAMPLE 6

The same stainless steel reactor as used in Example 5 was deaerated, and 1000 g of (perfluoropentyl)difluoro methane, 420 g of $CF_3CF_2CHCl_2$, 32 g of perfluoro(propyl vinyl ether) and 80 g of TFE were charged. The temperature was maintained at 50° C., and a perfluorohexane solution containing 1 wt % of di(perfluorobutyl)peroxide as a polymerization initiator, was charged to initiate the reaction. During the reaction, TFE was introduced into the system, and the reaction pressure was maintained at 5.1 kg/cm$^2$. The polymerization initiator was intermittently charged so that the polymerization rate became substantially constant, and a total of 7 cc was charged. 3.4 hours later, 64 g of a white copolymer was obtained in the form of a slurry. Further, it was granulated to have an average particle size of about 1 mm by using water as a medium. The copolymer had a melting point of 306° C. and a heat decomposition initiating pint of 480° C., and gave an excellent compression molded product at a molding temperature of 340° C. With respect to the molded product, the tensile strength was 390 kg/cm$^2$, and the tensile elongation was 370%.

EXAMPLE 7

Polymerization was carried out in the same manner as in Example 6 except that the 400 g of HFP was charged instead of 32 g of perfluoro(propyl vinyl ether), and the amount of $CF_3CF_2CHCl_2$ charged, was changed from 420 g to 50 g. 3.5 hours later, 65 g of a white copolymer was obtained in the form of a slurry. The copolymer had a melting point of 475° C. and a heat decomposition initiating point of 450° C., and gave an excellent compression molded product at a molding temperature of 340° C. Further, it was granulated to have an average particle size of about 1 mm by using water as a medium. With respect to the molded product, the tensile strength was 340 kg/cm$^2$, and the tensile elongation was 350%.

COMPARATIVE EXAMPLE 2

The same stainless steel reactor as used in Example 5, was deaerated, and 1200 g of (perfluoropentyl)difluoro methane, 50 g of methanol, 18 g of (perfluorobutyl)ethylene, 85 g of TFE and 5.9 g of ethylene were charged. The temperature was maintained at 50° C., and a perfluorohexane solution containing 1 wt % of di(perfluorobutyryl)peroxide as a polymerization initiator, was charged to initiate the reaction. During the reaction, a gas mixture of TFE and ethylene (molar ratio: TFE/ethylene=53/47) was introduced into the system, and the reaction pressure was maintained at 8.5 kg/cm$^2$. The polymerization initiator was intermittently charged so that the polymerization rate became substantially constant, and a total of 23 cc was charged. Two hours later, 75 g of a white copolymer was obtained in the form of a slurry. Granulation was attempted by using water as a medium, but no granules were obtained but a powder. The copolymer had a melting point of 272° C. and a heat decomposition initiating point of 350° C. Methanol does not substantially dissolve in perfluorohexane, and accordingly, the obtained polymer had a high melt viscosity, and no uniform molded product was obtained by compression molding at 300° C.

COMPARATIVE EXAMPLE 3

Polymerization was carried out in the same manner as in Example 5 except that 410 g of $CH_3CCl_2F$ was charged instead of $CF_2ClCF_2CHClF$. 75 g of polymer was obtained. This polymer was compression-molded at 300° C., whereby it underwent a color change to brown.

EXAMPLE 8

A stainless steel reactor having an internal capacity of 1.2 l, was deaerated, and 1350 g of $CF_3CF_2CF_2CF_2CH_2CH_3$ as a polymerization medium, and 1.8 g of methanol as a chain transfer agent, were charged, and 85 g of tetrafluoroethylene and 5.9 g of ethylene were charged,. The temperature was maintained at 65° C., and 3 ml of $CF_2ClCF_2CHClF$ solution containing 10 wt % of t-butylperoxyisobutyrate as a polymerization initiator, was charged to initiate the reaction. During the reaction, a gas mixture of tetrafluoroethylene and ethylene (molar ratio: $C_2F_4/C_2H_4$=53/47) was introduced into the system, and the reaction pressure was maintained at 13.5 g/cm$^2$.

Three hours later, 85 g of a white copolymer was obtained in the form of a slurry. The copolymer had a melting point of 278° C., a heat decomposition initiating point of 360° C. and a volume flow rate of 53, and gave a colorless compression molded product at a molding temperature of 300°

C. With respect to the molded product, the tensile strength was 428 kg/cm$^2$, and the tensile elongation was 440%. The obtained molded product was maintained at 250° C. for 3 days, whereby no substantial color change was observed. Using a die having an inner diameter of 1.0 mm and a length of 10.0 mm, extrusion was conducted at 300° C. at a extruding speed of 360 mm/min, whereby the die swell was 1.15.

EXAMPLE 9

A stainless steel reactor having an internal capacity of 1.2 l, was deaerated, and 1350 g of $CF_3CF_2CF_2CF_2CH_2CH_3$ as a polymerization medium and 1.8 g of methanol as a chain transfer agent, were charged, and 85 g of tetrafluoroethylene, 5.9 g of ethylene and 1.8 g of (perfluorobutyl)ethylene were charged. The temperature was maintained at 65° C., and 3 cc of a $CF_2ClCF_2CHClF$ solution containing 10 wt % of t-butylperoxyisobutyrate, was charged as a polymerization initiator to initiate the reaction. During the reaction, a gas mixture of tetrafluoroethylene, ethylene and (perfluorobutyl)ethylene (molar ratio: 53/47/0.7) was introduced into the system, and the reaction temperature was maintained. Three hours later, 85 g of a white copolymer was obtained in the form of a slurry. The copolymer had a melting point of 271° C., a heat decomposition initiating point of 360° C. and a volume flow rate of 53, and gave a colorless excellent compression molded product at a molding temperature of 300° C. With respect to the molded product, the tensile strength was 428 kg/cm$^2$, and the tensile elongation was 440%. At 180° C., the tensile strength was 85 kg/cm$^2$, and the tensile elongation was 450%. The obtained molded product was maintained at 250° C. for 3 days, whereby no substantial color change was observed. The degree of swelling of $CF_3CF_2CF_2CF_2CH_2CH_3$ to the obtained copolymer, was 1.8.

EXAMPLE 10

80 g of a copolymer was obtained in the same manner as in Example 9 except that the polymerization medium was changed to 1300 g of $CF_3CF_2CF_2CF_2CF_2CF_2H$. The melting point was 270° C., the heat decomposition initiating point was 355° C., and the volume flow rate was 60, and the copolymer gave a colorless excellent compression molded product at a molding temperature of 300° C. With respect to the molded product, the tensile strength was 445 kg/cm$^2$, and the tensile elongation was 420%. At 180° C., the tensile strength was 80 kg/cm$^2$, and the tensile elongation was 430%. The obtained molded product was maintained at 250° C. for 3 days, whereby no substantial color change was observed. The degree of swelling of $CF_3CF_2CF_2CF_2CF_2CF_2H$ to the obtained copolymer was 1.6.

COMPARATIVE EXAMPLE 4

90 of a copolymer was obtained in the same manner as in Example 9 except that the polymerization medium was changed to 1200 g of R113. The melting point was 270° C., the heat decomposition initiating point was 357° C., and the volume flow rate was 58. The copolymer gave a colorless excellent compression molded product at a molding temperature of 300° C. With respect to the molded product, the tensile strength was 445 kg/cm$^2$, and the tensile elongation was 420%. The obtained molded product was maintained at 250° C. for 3 days, whereby the product underwent a color change to brown. The degree of swelling of R113 to the obtained copolymer was 2.4.

INDUSTRIAL APPLICABILITY

According to the present invention, a fluorine-type polymer excellent in the heat resistance, solvent resistance, chemical resistance, etc. can be efficiently produced by using a polymerization medium which is less likely to bring about an environmental destruction and a chain transfer agent having good compatibility. Further, the chain transfer agent in the present invention is capable of increasing the affinity between the resulting fluorine-type polymer and the polymerization medium, whereby the handling efficiency in the step after polymerization (such as granulation or drying) can be improved.

We claim:

1. A method for producing a fluorinated polymer containing fluoroolefin units as the main constituting units by polymerization in a polymerization medium, wherein $CF_3(CF_2)_nCH_2CH_3$ or $CF_3(CF_2)_nH$, wherein n is an integer of from 1 to 8, is used as the polymerization medium, and wherein $CF_2ClCF_2CHClF$ and/or $CF_3CF_2CHCl_2$ is used as a chain transfer agent for polymerization.

2. The method according to claim 1, wherein $CF_3(CF_2)_nCH_2CH_3$ is $CF_3(CF_2)_3CH_2CH_3$.

3. The method according to claim 1, wherein $CF_3(CF_2)_nH$ is $CF_3(CF_2)_5H$.

4. A method for producing a fluorinated polymer containing fluoroolefin units as the main constituting units selected from the group consisting of a tetrafluoroethylene/ethylene copolymer, a tetrafluoroethylene/perfluoro(alkyl vinyl ether) copolymer, a tetrafluoroethylene/hexafluoropropylene copolymer, a tetrafluoroethylene/ethylene/(perfluoroalkyl)ethylene copolymer, and a tetrafluoroethylene/perfluorovinyl ether having a $FSO_2$-group copolymer by polymerization in a polymerization medium, wherein $CF_3(CF_2)_nCH_2CH_3$ or $CF_3(CF_2)_nH$, wherein n is an integer of from 1 to 8, is used as the polymerization medium.

5. The method according to claim 4, wherein $CF_3(CF_2)_nCH_2CH_3$ is $CF_3(CF_2)_3$ or $CF_3(CF_2)_5H$.

6. The method according to claim 1, wherein the amount of the polymerization medium is from 3 to 100 times the total weight of monomers.

7. The method according to claim 1, wherein $CF_2ClCF_2CHClF$ and/or $CF_3CF_2CHCl_2$ is used as a chain transfer agent for polymerization.

8. The method according to claim 1, wherein an alcohol is used as a chain transfer agent for polymerization.

9. The method according to claim 8, wherein the alcohol is methanol.

10. The method according to claim 8, wherein the amount of a chain transfer agent used, is from 0.01 to 200 wt % based on the total weight of the polymerization medium.

* * * * *